United States Patent [19]

Lackmann

[11] Patent Number: 4,770,883

[45] Date of Patent: Sep. 13, 1988

[54] SEGMENTING AND DEHYDRATION PROCESS FOR SUGAR BEETS

[76] Inventor: Richard K. Lackmann, Rte. 5, Box 458B, Detroit Lakes, Minn. 56501

[21] Appl. No.: 884,729

[22] Filed: Jul. 11, 1986

[51] Int. Cl.$^4$ .............................................. A23B 4/04
[52] U.S. Cl. .................................... 426/473; 426/465; 426/518; 99/470; 99/483
[58] Field of Search ................. 426/518, 473; 426/465; 83/171; 99/470, 483, 537

[56] References Cited

U.S. PATENT DOCUMENTS

| | | | |
|---|---|---|---|
| 1,900,974 | 3/1933 | Bozarth | 426/473 |
| 2,308,601 | 1/1943 | Gentele | 99/204 |
| 2,402,672 | 6/1946 | Schaffner | 99/204 |
| 2,846,319 | 8/1958 | Kelly | 99/205 |
| 3,343,961 | 9/1967 | Truax | 99/2 |
| 3,366,488 | 1/1968 | Wagner et al. | 99/105 |
| 3,549,384 | 12/1970 | Walker et al. | 426/518 |
| 3,927,588 | 12/1975 | Laderach | 83/15 |
| 3,973,047 | 8/1976 | Linaberry et al. | 426/473 |
| 4,135,309 | 1/1979 | Bosnjak | 426/465 |
| 4,139,647 | 2/1979 | Douglas | 426/482 |
| 4,352,325 | 10/1982 | Pleus | 99/483 |
| 4,380,127 | 4/1983 | Roberts | 99/483 |

Primary Examiner—Kenneth M. Schor
Assistant Examiner—V. Manoharan
Attorney, Agent, or Firm—Warren F. B. Lindsley

[57] ABSTRACT

A segmenting and dehydration process for fruits and vegetables with a primary application as a process for producing dehydrated filaments of sugar beets as a natural sweetener for use by confectioners, bakeries, breweries and other food processors. The beets are washed, shredded with a high-speed heated blade and immediately dried in a continuously sterile atmosphere that prevents bacteria contamination and growth and enzyme action which otherwise result in an unacceptably strong flavor in the finished product.

1 Claim, No Drawings

SEGMENTING AND DEHYDRATION PROCESS FOR SUGAR BEETS

BACKGROUND OF THE INVENTION

A first step in the dehydration process for fresh fruits, vegetables, and other food products, is commonly the cutting, slicing or segmenting of the food product into smaller pieces. This is done to speed the dehydration process and, in some cases, to reduce the fruit or vegetable to a particle size that is more convenient for packaging and marketing.

Difficulties encountered in connection with the cutting process include bacteria contamination and enzyme action (fermentation) triggered by exposure of the cut surfaces to the atmosphere.

Cutting equipment can very readily become contaminated with bacteria in a number of ways. The bacteria may be airborne, or it may be introduced by imperfect sanitation practices. Bacteria introduced by any such means thrives on the juices and food particles that collect on the surface of the cutting and handling equipment, and are then transferred to the food product being processed. The increased bacteria level raises the risk of spoilage in the dehydrated product.

The enzyme action that immediately begins at the severed surfaces of the fruit or vegetable which is devoid of the protection otherwise afforded by the skin is a fermentation process that produces discoloration, browning and nutrient loss and adversely affects the flavor of the finished product. The quality of the end product is thus reduced in most cases by the enzyme action which occurs before heat can be applied to control its activity. In other cases, the enzyme action prevents altogether the production of a satisfactory dehydrated product.

Of particular interest in connection with the present invention, is the control and limitation of bacterial contamination and enzyme action in the processing of sugar beets. A specific object of the invention is to provide a method for producing a natural sweetener in the form of dehydrated sugar beets. To date, such a process has not been successfully achieved, largely because of bacteria and enzyme action, and their adverse effects on flavor.

The process for making refined sugar from beets is costly and energy intensive. Furthermore the refining process removes the fiber and desirable nutrients which should, for reasons of health, be retained in the end product.

It is, therefore, highly desirable to provide a process for producing from sugar beets a more nutritious and healthful natural sweetener. At the same time, such a process should be characterized by a lower production cost and a lower energy requirement as compared with the present sugar refining process. Also, industry and ultimately the consumer is provided with an alternative natural high fiber sweetener in the form of dehydrated sugar beets. This new sweetener will expand the choices of industrial and domestic users.

DESCRIPTION OF THE PRIOR ART

Various methods and processes for controlling or limiting bacteria contamination and enzyme action during the processing of food products are described in the prior art.

U.S. Pat. No. 2,308,601 discloses a method of producing cooked foods in a dried state by heating the foods and subjecting them to a quick dehydration stage to prevent bacteria from developing.

U.S. Pat. No. 3,366,488 discloses the concept of heating tomatoes during maceration and then later dehydrating the product. The heat is employed to destroy enzymes.

U.S. Pat. Nos. 2,402,672; 2,846,319 and 3,343,961 disclose processes for heating foods from an initial stage through a drying stage, in some cases employing infared rays for heating the food.

U.S. Pat. No. 3,927,588 discloses the use of a heated cutting machine in a sterilized atmosphere for cutting meats. The meat is aseptically severed by a knife that is continuously heated to a temperature in excess of 100° C. by a blast of hot air.

U.S. Pat. No., 4,139,647 discloses a method of preheating a knife used in forming a puree of a fruit or vegetable product and then maintaining the sliced product in a chamber for a length of time sufficient to inactivate the enzymes therein.

The method of segmenting a raw fruit or vegetable with a heated knife or cutting machine as a first step in a dehydration process as proposed in the present invention is not described in the above referenced prior art.

SUMMARY OF THE INVENTION

In accordance with the invention claimed, an improved process is provided for producing from sugar beets a natural sweetener for industrial use by cereal makers, confectioners, bakeries, brewers, etc. The sweetener comprises dehydrated filaments of the sugar beet. A key feature of the process is the means by which bacterial contamination and enzyme action are substantially reduced or eliminated through the use of a heated knife followed immediately by dehydration in a heated atmosphere. The process is also applicable to the preparation of other dried fruits and vegetables.

It is, therefore, an object of the present invention to provide an improved method or process for dehydrating sugar beets, apples and other fruits and vegetables.

Another object of the invention is to incorporate in such a dehydration process a means for limiting bacterial contamination and enzyme action which otherwise impair the taste and quality of the end product.

A further object of the invention is to accomplish such a limitation of bacterial contamination and enzyme action through the use of a sterile cutting method wherein the raw food product is first cut into thin filaments which may then be quickly raised to an elevated temperature before enzyme action and bacterial growth may take place.

A still further object of the invention is to provide such a sterile cutting operation through the use of a heated high-speed cutting blade.

A still further object of the invention is to provide through the dehydration process of the invention an improved natural sweetener in the form of dehydrated filaments of the sugar beet.

A still further object of the invention is to provide such an improved natural sweetener in a form that retains the original fiber and desirable nutrients contained in the sugar beet, most of which are removed in the conventional sugar refining process.

A still further object of the invention is to provide a process for producing such an improved natural sweetener that is less costly and less energy intensive than is the conventional sugar refining process.

A still further object of the invention is to provide such a process which, by virtue of its limitation of bacterial and enzyme action, yields an end product that exhibits a neutral or more natural flavor than can otherwise be achieved.

A still further object of the invention is to provide such a cutting or segmenting and dehydration process that may be applied in the production of other dried fruits and vegetables such as dried apples, bananas and the like.

Further objects and advantages of the invention will become apparent as the following description proceeds, and the features of novelty which characterize the invention will be pointed out with particularity in the claims annexed to and forming a part of this specification.

DESCRIPTION OF THE PREFERRED EMBODIMENT

The dehydration process of the invention as applied specifically to the production of a natural sweetener from the sugar beet comprises the following steps:

1. Washing and thoroughly cleaning the raw sugar beets.

2. Cutting the cleaned beets into thin strips or filaments using a high-speed heated knife or blade in a high temperature enzyme inactivating environment or chamber having a sterile atmosphere which is maintained by a constant flow of a hot dry gas. The beets are sliced by the hot knives into small pieces or filaments. The filaments may be variable in size, ranging from ⅛ to 3/16 of an inch minimum dimension. The filaments are cauterized when cut by the surface of the heated knives.

3. The beet filaments are then immediately moved into an adjacent dehydration chamber without intermediate exposure to a nonsterile atmosphere, usually by the force of hot air moving through sterile atmosphere.

4. The dehydration stage utilizes hot air to reduce the moisture content of the beet filaments to a level low enough, usually 7 percent or less, to prevent deterioration of the product during storage and to permit its economical transport and distribution to the intended user.

The cleaning process must be sufficiently thorough to remove all traces of sand and soil that would interfere with the use of the end product as a food sweetener. This operation is, of course, also important as a first precaution in the elimination and control of bacteria action. Careful inspection and removal of defective beets or beets that have been damaged in harvesting in a way that permits entrapment of sand, soil or bacteria is also an essential part of the cleaning process.

The use of a knife or blade heated to a temperature of approximately 100 to 120 degrees Centigrade to segment the beet insures that bacteria is not permitted to collect and grow on the surface of the blade. It also assures that any bacteria that may be present on the surface of the beet will not be carried to the cut surfaces of the beet where they may more readily develop and multiply.

The use of a high-speed knife or blade in the cutting operation may be heated to an elevated temperature that would insure that the cut surface of the filaments be cauterized, then dehydrated. The cauterization for the filaments produce a product of a different flavor and color. This product may be desirable for certain uses and end product manufacture.

The cutting or shredding of the beets into thin strips or filaments is an essential prerequisite to the dehydration step, because it permits the very rapid penetration of heat. If dehydration of relatively large pieces or chunks of fruits or vegetables is attempted, the penetration of heat proceeds at a comparatively slow rate with the result that enzyme action and bacteria growth are actually encouraged during the dehydration process. If the dehydration temperature is raised to prevent this undesirable effect, burning or scorching of the exposed surfaces of the product result.

The cutting chamber and the subsequent dehydration chamber are immediately adjacent so that the cut product is moved immediately into the operating dehydration chamber without exposure to an intermediate nonsterile atmosphere.

In the dehydration chamber, the heat of the chamber very quickly penetrates the slender thin filaments raising their internal temperature to a level at which bacteria growth and enzyme action are inhibited. Moisture is removed by forced hot air that is directed and oriented in a manner that ensures the thorough exposure of the total quantity of shredded product. As the filaments dry and become lighter by a large percentage of their original weight, the regulated moving hot air is the vehicle that transports the lighter, dryer filaments out of the rotary kiln dryer or off of the endless conveyor belt. The dehydrated filaments are then cooled preparatory to packaging or bulk storage.

The process as described, yields a natural sweetener from sugar beets in accordance with the stated objects of the invention. The limitation of bacteria growth and enzyme action results in an end product that has a sweet but otherwise neutral flavor in contrast to the strong flavor that occurs in the prior art. The extremely simple process with its small number of steps or stages is cost effective and low in energy utilization as compared with the conventional sugar refining process.

While the instant application of the invention is intended for the production of an improved natural sweetener, it is anticipated that dried fruit and vegetable products of improved quality may also be obtained through the application of the same or a similar process.

It should be noted that the purpose of this invention is to obtain a new and natural high fiber sweetener through the use of a heated knife or cutter, and the immediate introduction of the cut filaments into a dehydrator.

The need for the heated knife or cutter is reduced if the sugar beets are cold, near freezing or frozen, since enzyme and bacteria action at these temperatures are minimized.

While in the frozen or near frozen condition, chemical change in the beet is reduced and more sugar can be extracted than from beets grown and stored in the southern parts of the United States where they must be processed soon after being removed from the soil to retain their sugar content.

Although any suitable dehydrator may be utilized in practicing the invention, the Food Engineering Corporation of Minneapolis, Minn. manufacture and sell equipment suitable for the disclosed process.

Although but a single embodiment of the invention has been described, it will be apparent to those skilled in the art that various changes and modifications may be made therein without departing from the spirit of the invention or from the scope of the appended claims.

What is claimed is:

1. A method of processing raw sugar beets to produce a natural sweetener which is comprised of dehydrated filaments of the sugar beets, said method comprising the steps of:

washing the raw sugar beet;

preheating knives to a temperature of about 100° C. to 120° C.;

hot slicing the raw sugar beet with said preheated knives to produce cauterized filaments in a heated sterile atmosphere;

said filaments having a minimum dimension of from ⅛ of an inch to 3/16 of an inch;

obtaining said heated sterile atmosphere by moving hot air through said atmosphere surrounding said knives and maintaining said knives heated by the hot air flowing through said heated sterile atmosphere;

moving said filaments directly, without exposure to a nonsterile atmosphere, from said heated sterile atmosphere by the hot air moving through said heated sterile atmosphere into a dehydration chamber;

dehydrating said filaments to reduce their moisture content to not more than seven percent to prevent deterioration during storage; and cooling the dehydrated filaments preparatory to packaging and storage.

* * * * *